US007529637B2

(12) United States Patent
Snyder

(10) Patent No.: US 7,529,637 B2

(45) Date of Patent: May 5, 2009

(54) METHOD AND APPARATUS TO DETERMINE PRESSURE IN AN UNFIRED CYLINDER

(75) Inventor: Bryan R. Snyder, Waterford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 158 days.

(21) Appl. No.: 11/669,522

(22) Filed: Jan. 31, 2007

(65) Prior Publication Data

US 2008/0183372 A1 Jul. 31, 2008

(51) Int. Cl.
*G01L 7/00* (2006.01)
*G01F 17/00* (2006.01)

(52) U.S. Cl. ....................... 702/138; 123/435; 180/165; 701/103; 702/55

(58) Field of Classification Search ................. 702/100, 702/102, 116, 138, 140, 146, 185, 187, 55; 701/103, 114; 123/299, 435; 73/114.16; 180/165

See application file for complete search history.

(56) References Cited

U.S. PATENT DOCUMENTS 7,231,998 B1 * 6/2007 Schechter ................... 180/165
7,367,319 B2 * 5/2008 Kuo et al. ................... 123/435

* cited by examiner

*Primary Examiner*—John H Le

(57) ABSTRACT

An article of manufacture and method are provided to determine pressure in an unfired cylinder of an internal combustion engine. The cylinder comprises a variable volume combustion chamber defined by a piston reciprocating within a cylinder between top-dead center and bottom-dead center points and an intake valve and an exhaust valve controlled during repetitive, sequential exhaust, intake, compression and expansion strokes of said piston. The code is executed to determine volume of the combustion chamber, and determine positions of the intake and exhaust valves. A parametric value for cylinder pressure is determined at each valve transition. Cylinder pressure is estimated based upon the combustion chamber volume, positions of the intake and exhaust valves, and the cylinder pressure at the most recently occurring valve transition.

22 Claims, 2 Drawing Sheets

METHOD AND APPARATUS TO DETERMINE PRESSURE IN AN UNFIRED CYLINDER

TECHNICAL FIELD

This invention pertains generally to control systems for engine and powertrain systems.

BACKGROUND OF THE INVENTION

Internal combustion engines are employed on various devices, including mobile platforms, to generate torque for traction and other applications. An internal combustion engine can be an element of a powertrain architecture operative to transmit torque through a transmission device to a vehicle driveline. The powertrain architecture can further include one or more electrical machines working in concert with the engine. During ongoing operation of the mobile platform employing the internal combustion engine, it may be advantageous to discontinue firing one or more of the cylinders, including stopping engine operation and engine rotation completely. It may be further advantageous to subsequently have knowledge of pressure within the cylinder, to effectively spin, fire, and restart the engine during ongoing operation, to control and manage engine torque vibration, reduce noise, and improve overall operational control of the powertrain.

Prior art systems use models developed off-line to determine cylinder pressure. Such systems are advantageous in that they minimize need for real-time computations. However, such systems have relatively poor accuracy, due to variations introduced by real-time variations in factors including atmospheric pressure, engine speed, initial engine crank angle, engine wear characteristics, and others. Therefore, there is a need to accurately determine engine cylinder pressure in real-time during ongoing operation of the engine.

SUMMARY OF THE INVENTION

In accordance with an embodiment of the invention, an article of manufacture and method are provided, comprising a storage medium having machine-executable code stored therein. The stored code is to determine pressure in an unfired cylinder of an internal combustion engine. The cylinder comprises a variable volume combustion chamber defined by a piston reciprocating within a cylinder between top-dead center and bottom-dead center points and an intake valve and an exhaust valve controlled during repetitive, sequential exhaust, intake, compression and expansion strokes of said piston. The code is executed to determine volume of the combustion chamber, and determine positions of the intake and exhaust valves. A parametric value for cylinder pressure is determined at each valve transition. Cylinder pressure is estimated based upon the combustion chamber volume, positions of the intake and exhaust valves, and the cylinder pressure at the most recently occurring valve transition.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
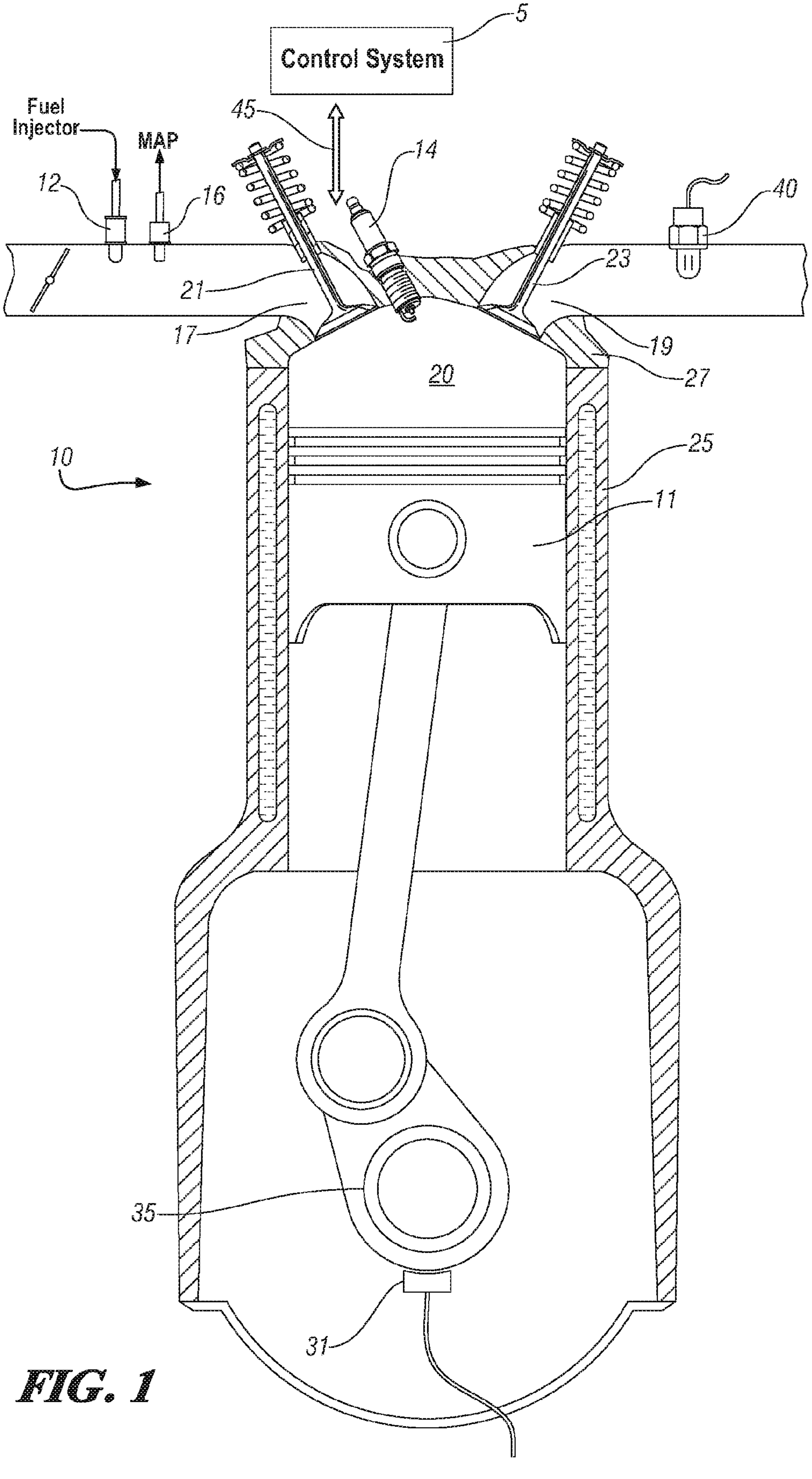
FIG. 1 is a schematic diagram of an exemplary engine, in accordance with the present invention; and, FIG. 2 is a schematic diagram of an exemplary control scheme, in accordance with the present invention.

Referring now to the drawings, wherein the depictions are for the purpose of illustrating the invention only and not for the purpose of limiting the same, FIG. 1 depicts a schematic of an internal combustion engine 10 and control system 5 which has been constructed in accordance with an embodiment of the present invention. The engine is meant to be illustrative, and comprises a conventional fuel-injection spark ignition engine. It is understood that the present invention is applicable to a multiplicity of internal combustion engine configurations.

The exemplary engine comprises an engine block 25 having a plurality of cylinders and a cylinder head 27 is sealably attached thereto. There is a moveable piston 11 in each of the cylinders, which defines a variable volume combustion chamber 20 with walls of the cylinder, the head, and the piston. A rotatable crankshaft 35 is connected by a connecting rod to each piston 11, which reciprocates in the cylinder during ongoing operation. The cylinder head 27 provides a structure for intake port 17, exhaust port 19, intake valve(s) 21, exhaust valve(s) 23, and spark plug 14. A fuel injector 12 is preferably located in or near the intake port, is fluidly connected to a pressurized fuel supply system to receive fuel, and is operative to inject or spray pressurized fuel near the intake port for ingestion into the combustion chamber periodically during ongoing operation of the engine. Actuation of the fuel injector 12, and other actuators described herein, is controlled by an electronic engine control module ('ECM'), which is an element of the control system 5. Spark plug 14 comprises a known device operative to ignite a fuel/air mixture formed in the combustion chamber 20. An ignition module, controlled by the ECM, controls ignition by discharging requisite amount of electrical energy across a spark plug gap at appropriate times relative to combustion cycles. The intake port 17 channels air and fuel to the combustion chamber 20. Flow into the combustion chamber 20 is controlled by one or more intake valves 21, operatively controlled by a valve actuation device comprising a lifter in conjunction with a camshaft (not shown). Combusted (burned) gases flow from the combustion chamber 20 via the exhaust port 19, with the flow of combusted gases through the exhaust port controlled by one or more exhaust valves 23 operatively controlled by a valve actuation device such as a second camshaft (not depicted). Specific details of a control scheme to control opening and closing of the valves are not detailed. Valve actuation and control devices, including hydraulic valve lifter devices, variable cam phasers, variable or multi-step valve lift devices, and cylinder deactivation devices and systems can be utilized to extend operating regions of the engine and fall within the purview of the invention. Other generally known aspects of engine and combustion control are known and not detailed herein. The engine operation typically comprises conventional four stroke engine operation wherein each piston reciprocates within the cylinder between top-dead center (TDC) and bottom-dead center (BDC) locations defined by rotation of the crankshaft 35, with opening and closing of the intake valves and exhaust valves controlled during repetitive, sequential exhaust, intake, compression and expansion strokes.

In one embodiment, the engine is an element of a hybrid powertrain system comprising the engine, an electro-mechanical transmission, and a pair of electric machines comprising motor/generators. The aforementioned elements are controllable to selectively transmit torque therebetween, to generate tractive or motive torque for transmission to a driveline and to generate electrical energy for transmission to one of the electrical machines or to an electrical storage device.

The ECM is preferably an element of the overall control system 5 comprising a distributed control module architecture operative to provide coordinated powertrain system control. The powertrain system control is effective to control the engine to meet operator torque demands, including power for propulsion and operation of various accessories. Communication between the control system and the engine 10 is depicted generally as element 45, and comprises a plurality of data signals and control signals that are transferred between elements of the engine and the control system. The ECM collects and synthesizes inputs from sensing devices, including a MAP (manifold absolute pressure) sensor 16, an engine crank sensor 31, an exhaust gas sensor 40, and a mass airflow sensor (not shown), and executes control schemes to operate various actuators, e.g., the fuel injector 12 and the ignition module for spark ignition at the spark plug 14, to achieve control targets, including such parameters as fuel economy, emissions, performance, driveability, and protection of hardware. The ECM is preferably a general-purpose digital computer generally comprising a microprocessor or central processing unit, storage media comprising read only memory (ROM), random access memory (RAM), electrically programmable read-only-memory (EPROM), a high speed clock, analog-to-digital (A/D) and digital-to-analog (D/A) conversion circuitry, and input/output circuitry and devices (I/O) and appropriate signal conditioning and buffer circuitry. Control schemes, comprising algorithms and calibrations, are stored as machine-executable code in memory devices and selectively executed. Algorithms are typically executed during preset loop cycles such that each algorithm is executed at least once each loop cycle. Algorithms stored as machine-executable code in the memory devices are executed by the central processing unit and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The invention comprises a simulation model that is stored as machine-executable code and is regularly executed in the control system. The simulation model is operative to calculate, in real-time, a cylinder pressure for each cylinder as a function of engine crank angle. Cylinder pressure is generated by the action of crankshaft rotation wherein movements of the pistons in the engine cylinders are resisted by air trapped within the combustion chambers of the cylinders. Crank torque, i.e., torque exerted on the crankshaft by each piston, is determined from the cylinder pressure. Total engine crank torque is determined, comprising a sum of the cylinder torques calculated for each cylinder. Each cylinder torque is determined by multiplying a torque ratio by a cylinder pressure. The torque ratio is determined for each cylinder as a function of crank angle, which encompasses changes in cylinder geometry and cylinder friction. The torque ratio is preferably a pre-calibrated array of values stored in memory, and retrievable as based upon crank angle.

The simulation model generally comprises machine-executable code, stored in the ECM or other control module of the control system, which determines pressure in an unfired cylinder(s) of the internal combustion engine during operation of the powertrain system when the engine is motoring, i.e., the engine crankshaft is rotating without spark ignition and fuel injection to the cylinders. The simulation model begins execution substantially simultaneously with start of rotation of the stopped engine, or when engine firing has stopped due to stoppage of engine fueling and/or spark ignition. Such instances of operation occur when the engine is being started, or stopped, or when specific cylinders are deactivated. Engine starting can comprise rotation of the engine crankshaft for a period of time before introducing fuel or spark ignition to cylinders. The pressure is preferably determined regularly every few degrees of engine rotation, typically at least once every five degrees of crankshaft rotation, or during each 6.25 ms loop cycle.

The code comprises determining an instantaneous measure of combustion chamber volume, and determining positions of the intake and exhaust valves. This includes determining cylinder pressure at each valve transition. There are four valve transition events which occur during ongoing engine operation, comprising intake valve opening (IVO), intake valve closing (IVC), exhaust valve opening (EVO) and exhaust valve closing (EVC). Cylinder pressure for each unfired cylinder is determined based upon the combustion chamber volume, positions of the corresponding intake and exhaust valves, and the cylinder pressure at a most recently occurring valve transition.

The cylinder pressure is calculated, as described hereinbelow. The general cylinder pressure equation is as follows in Eq. 1:

$$P2=P1*(V1/V2)^{1.3} \quad [1]$$

wherein P2 indicates cylinder pressure at the current timestep, and P1 indicates cylinder pressure determined at the most recently occurring valve transition. Cylinder compression is approximated as an adiabatic compression, i.e., having minimal or no heat transfer. The term V1 comprises combustion chamber volume at the most recently previously occurring valve transition, and V2 comprises the combustion chamber volume at the current timestep, based upon a predetermined calibration comprising a range of combustion chamber volumes determined based upon engine crank angle. An algorithm operative to execute Eq. 1 is executed only when the intake and exhaust valves are all closed, i.e., ValveState is ValvesClosed. Pressure and torque calculations are preferably computed at the highest calculation rate, i.e., 6.25 ms.

When the exhaust valves are open (i.e., ValveState is ExhaustOpen), P2 is determined based upon a first-order lag filter leading to atmospheric pressure. An overall assumption is that the airflow speeds are sufficiently low that exhaust backpressure is at ambient atmospheric pressure. When the intake valves are open, P2 is determined based upon a first-order lag filter leading to manifold pressure. An overall assumption of the model is that the airflow speeds are sufficiently low enough that exhaust backpressure is fixed at zero (0.0 kPa) for all calculations. When the valves are closed, necessary data is calculated before the valves close. For forward engine rotation, the intake valve is closing, P1 is initialized to manifold pressure (MAP) and V1 is calculated by using the angle for IVC and the calibration of combustion chamber volume based upon engine crank angle. For reverse engine rotation, the exhaust valve is closing, P1 is initialized to atmospheric pressure and V1 is calculated by using the angle for EVO and the calibration of combustion chamber volume based upon engine crank angle. A correction is also made for leakage and blow-by past the piston, which is critical for low engine speeds to achieve correct initial conditions. This comprises modifying the value for P1 to $P1_{adj}$ to account for losses proportional to the pressure difference between P1 and P2, this modification or adjustment comprising Eq. 2:

$$P1_{adj}=P1-K^*(P2-P_{atm}) \quad [2]$$

wherein K is a calibratable system-specific filter coefficient or gain factor.

The calibration of combustion chamber volumes (V1, V2) based upon engine crank angle is preferably stored in RAM as a long indexed array of the combustion chamber volume corresponding to engine crank angle to enhance computational speed, allowing the control module executing the simulation to determine the torque ratio from a precalibrated array index based upon engine crank angle. The exponent function for $(V1/V2)^{1.3}$ is estimated as a second-order polynomial for the ranges of representative volume ratios (V1/V2 ranging from about 0.2 to 15), which provides a good practical fit and dramatically reduces computational load. Key strategies to effect real-time pressure and torque calculations include the previously described calibration for combustion chamber volume based upon engine crank angle, and a calibration for crank torque based upon cylinder pressure, which are determined offline for the specific engine application and executed as calibrations to minimize computational load.

Each opening and closing event of the intake and exhaust valves is modeled as discrete, i.e., the valve is either open or closed. When one of the valves is transitioned to open, the cylinder pressure is filtered to one of either manifold pressure (MAP) or exhaust pressure, $P_{EXHAUST}$, which is assumed to be atmospheric pressure, as shown in Eq. 3:

$$P2=P1^*(1-K)+P_{EXHAUST}^*K; \quad [3]$$

wherein P2 indicates cylinder pressure at the current timestep, and P1 indicates cylinder pressure determined at the most recently occurring valve transition. Each valve timing event requires accurate timing, preferably less than five crank angle degrees of rotation. This includes speed-based corrections which are made to account for airflow dynamics and pump-down and leakage of valve lifters.

The effect of valve position and valve timing on cylinder pressure is also modeled for inclusion in the control scheme. During ongoing engine operation the four valve transition events, comprising intake valve opening (IVO), intake valve closing (IVC), exhaust valve opening (EVO) and exhaust valve closing (EVC), ongoingly occur. With regard to modeling cylinder pressure, crank angle at which IVC occurs is critical, as this initiates engine operation with all the valves closed when the engine is rotating in a positive direction, and the combustion chamber is essentially a closed chamber with pressure varying based upon volume of the combustion chamber. To limit computational load, only factors significantly affecting IVC angle are modeled. Within the fastest computational loop (i.e., 3.125 ms) the simulation model monitors crank angle for each cylinder and assigns a ValveState flag which is set to one of IVO, EVO, and, Valves Closed (IVC and EVC). Valve overlap is ignored because of the minor influence on crank torque. There are two primary influences on IVC angle. Air flow dynamics are a function of engine speed and change the effective valve closing angle when modeling the valve timing as 100% open or 100% closed.

Furthermore, at low and zero engine speed, hydraulic valve lifters tend to leak down on any valves that are in an open state, until either the valve closes or the lifter fully collapses. As engine speed increases the velocity of air exiting the valve increases. Therefore, the valve must open further for similar pressure drop. This is addressed using computational flow dynamics (CFD) simulations developed off-line executed with actual valve dynamics to assess the maximum cylinder pressure achieved at piston top-dead-center (TDC). The simplified model shown in Eq. 2 can be restated as Eq. 4:

$$V_{IVC}=(P_{TDC}/P_{IVC})^{0.769}*V_{TDC}, \quad [4]$$

wherein $V_{IVC}$ is combustion chamber volume at intake valve closing;

$P_{TDC}$ is cylinder pressure at top-dead-center;

$P_{IVC}$ is cylinder pressure at intake valve closing; and, $V_{TDC}$ is combustion chamber volume at top-dead-center.

$V_{IVC}$ can be used to directly determine the crank angle at IVC, which depicts valve lift at the equivalent IVC (EIVC) using a precalibrated cam profile calibration, IntakeProfile, to determine valve lift based upon crank angle. An off-line simulation is preferably used to determine the calibration table for valve lift based upon engine speed (IVCLift_v_RPM) at different engine speeds. The data is curve-fit to determine a slope of lift at IVC, based upon the engine speed. This calibration permits real-time determination of the valve lift at which to transition the model from the intake valve being open (IVO) to the intake valve being closed (IVC) by multiplying the calibration value by the engine speed, as shown in Eq. 5:

EIVC_Lift=RPM*IVCLift_*v*_RPM. [5]

Valve lifters can leakdown at slow engine speed and engine off, which affects the effective valve timing at engine start. When a valve is open, the valvetrain load is applied to the hydraulic lifter, which is not a perfectly sealed device, resulting is fluid leaks and lifter and valve displacement. The leakdown rate is highly variable with temperature, wear, and component tolerances. The lifter leaks until it either bottoms out or the valve closes. The cylinder model typically does not track during the few seconds it takes the lifter to leak down at zero speed, due to too many sources of variation. However, control schemes typically transition cylinders to unfired operation for longer than a few seconds, allowing the final position to be modeled reasonably well.

In this embodiment, only the intake valve lifter is modeled to reduce computational load and save time. The effect of exhaust valve timing on compression torque is considered less critical. This is because opening of the exhaust valve occurs at the end of the pressure estimation operation, and closing of the exhaust valve is coincident with opening of the intake valve, and outside of the pressure estimation window described with reference to Eq. 2, above.

Based upon ValveState data, when the valve transition state comprises IVO, or IntakeOpen, the lifter leakdown variable for that cylinder is incremented. Data is typically provided in dimensions of millimeters (mm) of lift and referenced to the cam profile. The leakdown variable is limited to a calibrated value for maximum leakdown. When the ValveState changes to ValvesClosed or ExhaustOpen then the lifter leakdown is reset to zero. For the exhaust valve transitions, angles for EVO and EVC are fixed calibrations, because variation in timing of either transition does not introduce enough final torque error to warrant the calculations to model more completely. For the intake valve transition, both IVO and IVC are adjusted. The IVO transition is preferably calculated using a base calibration for IVO (BaseIVO) based upon the cam profile diagram incremented by a factor based upon an approximate slope of the cam opening (CamSlope) and the lifter leakdown (LifterLeakdown):

IVO angle=BaseIVO+CamSlope*LifterLeakdown

The angle for IVC is calculated more accurately using both LifterLeakdown and the lift required for effective IVC. The actual cam profile is preferably used as a calibration to provide the intake valve profile, IntakeProfile, based upon cam lift and camshaft angle. The total cam lift where the intake valve is considered open is computed as:

Lift=EIVC_Lift+LifterLeakdown.

The angle for IVC can be looked up in the cam profile calibration, IntakeProfile, at the calculated lift. This calculation typically occurs at one of the slower loop cycle rates, with the data fed into the fast inner loop to estimate cylinder pressures and assign valve state for each of the intake and exhaust valves.

The calibration of torque ratio based upon crank angle, TorqRatio_Vs_Angle, is preferably constructed offline and represents an equivalent value for crank torque (in Nm) as a function of cylinder pressure (in kPa) determined at each crank angle. The torque ratio parameters are developed for the specific engine design and configuration, and include factors related to cylinder geometry and piston friction. A factor for torque ratio, TorqRatio, can be determined from the calibration TorqRatio_Vs_Angle for each cylinder as a function of crank angle. Thus, cylinder torque for a given cylinder comprises the estimated cylinder pressure multiplied by the torque ratio, i.e., CylTorq=TorqRatio*CylPres. Total crankshaft torque is determined to be a sum of the cylinder torque values, CylTorq, for each of the cylinders. The calibration of TorqRatio_Vs_Angle is preferably stored in non-volatile computer memory as an array to improve computational speed.

The real-time simulation model for determining cylinder compression pressure preferably begins operating at or before the point in time at which the engine crankshaft begins spinning, or after engine firing has been discontinued precedent to stopping engine rotation. Thus by modeling valve timing, generating calibration tables offline, and assuming simple adiabatic compression, the instantaneous torque applied to the crank can be accurately estimated in real time in the control module.

Figure 2:
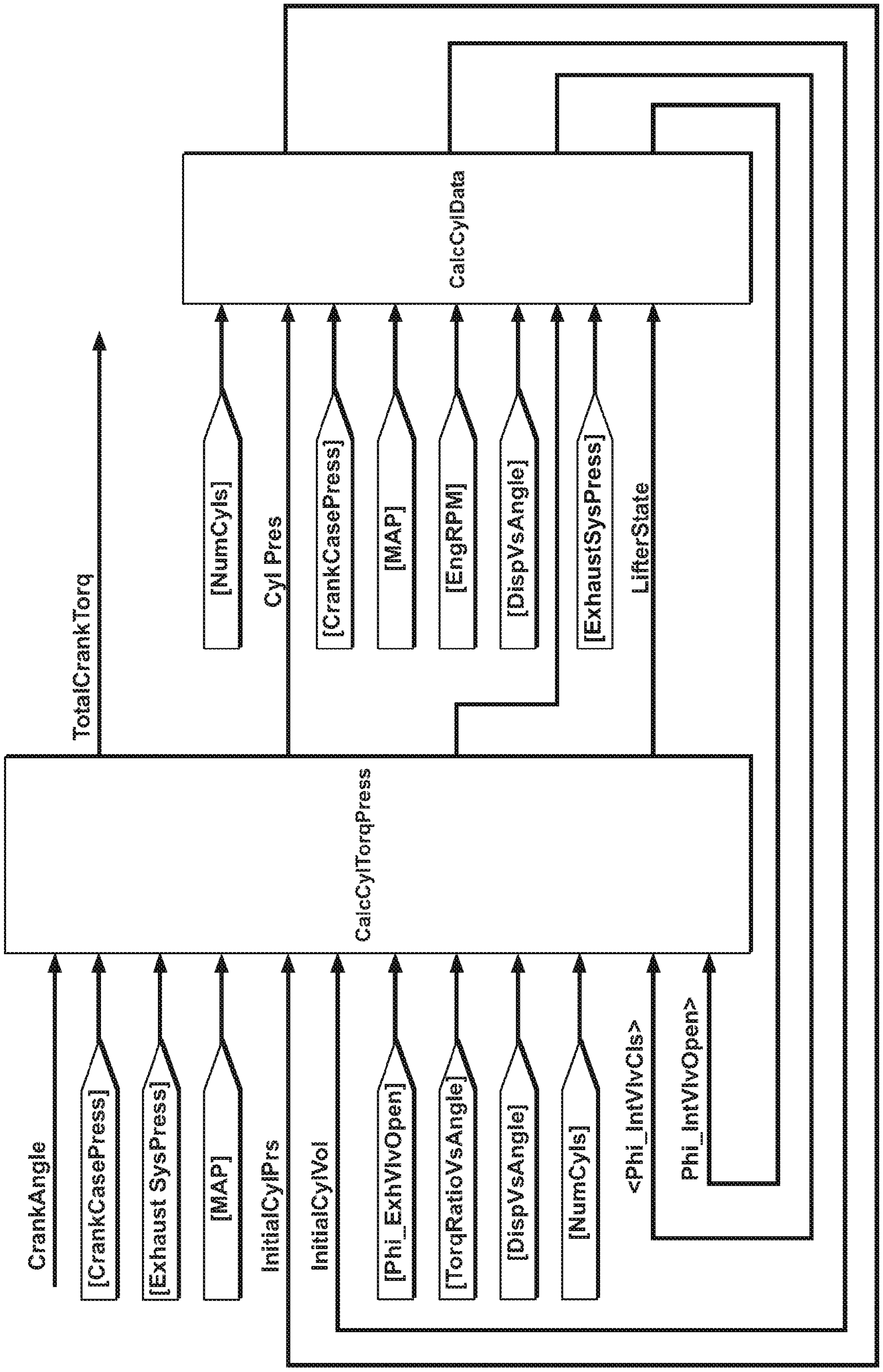

Referring now to FIG. 2, a schematic block diagram of an overall control scheme designed in accordance with an embodiment of the invention is provided. The control scheme described is preferably executed using an embedded controller in the control system described herein. The control system preferably executes the control scheme when there is a need for information related to cylinder pressure including engine crank torque, for purposes of engine or powertrain control, such as during starting of the engine, or during engine shutdown. The control scheme may also be executed when one or more of the cylinders are deactivated.

There are two functional elements of the overall control scheme, comprising a control scheme operative to calculate cylinder torque and pressure, depicted as CalCylTorqPress, and a control scheme operative to calculate cylinder data, depicted as CalcCylData.

The CalcCylData control scheme is preferably executed each 25 ms loop cycle for each engine cylinder when enabled, such as during an engine-start operation. Inputs to the Calc CylData control scheme comprise the number of engine cylinders (NumCyls), crankcase pressure (CrankCasePress), engine intake manifold pressure (MAP), engine speed (Eng RPM), exhaust system pressure (ExhaustSysPress). Further inputs include the lifter state (LifterState) and current cylinder pressure (CylPres) for the selected engine cylinder, which are outputs from the CalCylTorqPress control scheme. Another input comprises the precalibrated array of combustion chamber volume determined as a function of engine crank angle (DispVsAngle). From the inputs previously described, various outputs of the CalcCylData control scheme are determined and input to CalCylTorqPress control scheme. The outputs comprise intake valve opening angle (Phi_IntVlvOpen), intake valve closing angle (Phi_IntVlvCls), an initial combustion chamber volume (InitialCylVol), and an initial cylinder pressure (InitialCylPrs) for the cylinder.

The CalCylTorqPress control scheme is preferably executed during each 6.25 ms loop cycle for each engine cylinder when enabled. Inputs to the CalCylTorqPress control scheme comprise states of parameters typically based upon measurements, including engine crank angle (CrankAngle), and engine intake manifold pressure (MAP). Other engine states that are determined comprise crank case pressure (CrankCasePress) and exhaust system pressure (ExhaustSysPress). Further values include exhaust valve opening angle (Phi_ExhVlvOpen) comprising a predetermined calibration for torque ratio determined based upon crank angle (TorqRatioVsAngle), a predetermined calibration for combustion chamber displacement based upon crank angle (Disp VsAngle), and the number of cylinders (NumCyls). Furthermore, the inputs from CalcCylData control scheme, including intake valve opening angle (Phi_IntVlvOpen), intake valve closing angle (Phi_IntVlvCls), an initial combustion chamber volume (InitialCylVol), and an initial cylinder pressure (InitialCylPrs) are provided.

The CalCylTorqPress control scheme is configured to manipulate the inputs described to calculate and determine the outputs, including the cylinder pressure and crankshaft torque (TotalCrankTorq) using the equations and calibrations described hereinabove during ongoing operation, when the control scheme is enabled to do so.

Alternate embodiments are allowable within the scope of the invention, including systems employing valve management devices such as variable cam phasing. In an embodiment employing variable cam phasing, the cam phasing is preferably locked into a park position during execution of the simulation model. The park position can be either a full cam advance position, or a full cam retard position, preferably the full cam retard position to minimize magnitude of compression pulses.

The specific details of the control schemes and associated results described herein are illustrative of the invention as described in the claims. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Article of manufacture, comprising a storage medium having a machine-executable program encoded therein to determine pressure in an unfired cylinder of an internal combustion engine, the cylinder comprising a variable volume combustion chamber defined by a piston reciprocating within the cylinder between a top-dead center position and a bottom-dead center position and an intake valve and an exhaust valve controlled during repetitive, sequential exhaust, intake, compression and expansion strokes, said piston operatively connected to a rotatable engine crankshaft, the program comprising:

code to determine volume of the combustion chamber;

code to determine positions of the intake and exhaust valves;

code to determine a parametric value for cylinder pressure at each valve transition; and code to estimate cylinder pressure based upon the combustion chamber volume, positions of the intake and exhaust valves, and the cylinder pressure at a most recently occurring valve transition.

2. The article of claim 1, wherein the code to determine the volume of the combustion chamber comprises code to select combustion chamber volume from a precalibrated array of combustion chamber volumes indexed to a rotational position of the engine crankshaft.

3. The article of claim 1, wherein the code to determine a parametric value for cylinder pressure at each valve transition comprises code to estimate the cylinder pressure based upon intake manifold pressure subsequent to opening the intake valve.

4. The article of claim 1, wherein the code to determine a parametric value for cylinder pressure at each valve transition comprises code to estimate the cylinder pressure based upon atmospheric pressure subsequent to opening the exhaust valve.

5. The article of claim 1, wherein the code to estimate the cylinder pressure based upon combustion chamber volume, valve position, and the cylinder pressure at each valve transition comprises code to estimate the cylinder pressure based upon atmospheric pressure when the exhaust valve is open.

6. The article of claim 1, wherein the code to estimate the cylinder pressure based upon combustion chamber volume, valve position, and the cylinder pressure at each valve transition comprises code to estimate the cylinder pressure based upon manifold pressure subsequent to opening the intake valve.

7. The article of claim 1, wherein the code to estimate the cylinder pressure based upon combustion chamber volume, valve position, and the cylinder pressure at each valve transition comprises code to determine the cylinder pressure based upon a cylinder compression ratio subsequent to closing the intake valve.

8. The article of claim 7, further comprising:

code to determine the cylinder compression ratio based upon an adiabatic approximation of a volumetric ratio between the current combustion chamber volume and the combustion chamber volume at the most recently previously occurring valve transition; and code to determine the current cylinder pressure based upon the cylinder compression ratio.

9. The article of claim 1, wherein the code is executed to determine pressure in the unfired cylinder during engine motoring prior to firing the engine.

10. The article of claim 9, wherein execution of the machine-executable code begins substantially simultaneously with beginning of rotation of the engine.

11. The article of claim 10, further comprising repetitively executing the machine-executable code at least once every five degrees of crank angle rotation prior to firing the engine.

12. The article of claim 1, wherein the code is executed to determine pressure in the unfired cylinder during engine motoring after discontinuing firing the engine.

13. The article of claim 1, further comprising code to adjust the estimated cylinder pressure based upon engine rotational speed.

14. The article of claim 1, further comprising code to adjust the estimated cylinder pressure based upon leakdown of the intake valve.

15. A method for determining engine crank torque in an unfired multi-cylinder internal combustion engine comprising a plurality of variable volume combustion chambers each defined by a piston reciprocating within one of the cylinders between top-dead center and bottom-dead center positions and an intake valve and an exhaust valve controlled during repetitive, sequential exhaust, intake, compression and expansion strokes, each piston operatively connected to a rotatable engine crankshaft, the method comprising:

determining volume of each of the combustion chambers;

determining positions of the intake and exhaust valves;

determining a cylinder pressure at each valve transition;

estimating cylinder pressure for each cylinder based upon the combustion chamber volume, positions of the intake and exhaust valves, and the cylinder pressure at a most recently occurring valve transition;

determining a cylinder crank torque for each cylinder based upon the estimated cylinder pressures; and determining an overall crank torque based upon the cylinder crank torques for each of the cylinders.

16. The method of claim 15, wherein determining engine compression torque during the engine rotation is based upon an engine compression torque simulation.

17. The method claim 16, further comprising executing the engine compression torque simulation to predict engine torque over a range of ambient and engine operating conditions.

18. The method of claim 15, wherein estimating the cylinder pressure based upon combustion chamber volume, valve position, and the cylinder pressure at each valve transition comprises determining the cylinder pressure based upon a cylinder compression ratio subsequent to closing the intake valve.

19. The method of claim 18, further comprising:

determining the cylinder compression ratio based upon an adiabatic approximation of a volumetric ratio between the current combustion chamber volume and the combustion chamber volume at the most recently previously occurring valve transition; and determining the current cylinder pressure based upon the cylinder compression ratio.

20. A method for determining pressure in an unfired cylinder of an internal combustion engine, the cylinder comprising a variable volume combustion chamber defined by a piston reciprocating within a cylinder between top-dead center and bottom-dead center positions and an intake valve and an exhaust valve controlled during repetitive, sequential exhaust, intake, compression and expansion strokes, said piston operatively connected to a rotatable engine crankshaft, the method comprising:

determining volume of the combustion chamber;

determining positions of the intake and exhaust valves;

determining cylinder pressure at each valve transition; and estimating cylinder pressure based upon the combustion chamber volume, positions of the intake and exhaust valves, and the cylinder pressure at a most recently occurring valve transition.

21. A method to determine pressure in an unfired cylinder of an internal combustion engine, the cylinder comprising a variable volume combustion chamber defined by a piston reciprocating within a cylinder between top-dead center and bottom-dead center positions and an intake valve and an exhaust valve controlled during repetitive, sequential exhaust, intake, compression and expansion strokes, said piston operatively connected to a rotatable engine crankshaft, the method comprising:

determining volume of the combustion chamber;

determining positions of the intake and exhaust valves;

determining cylinder pressure at each valve transition; and estimating cylinder pressure based upon the combustion chamber volume, positions of the intake and exhaust valves, and the cylinder pressure at a most recently occurring valve transition;

wherein estimating cylinder pressure based upon cylinder volume, valve position, and the cylinder pressure at each valve transition comprises determining the cylinder pressure based upon a cylinder compression ratio subsequent to closing the intake valve.

22. The method of claim 21, further comprising determining the cylinder compression ratio based upon an adiabatic approximation of a volumetric ratio between the current combustion chamber volume and the combustion chamber volume at the most recently previously occurring valve transition; and determining the current cylinder pressure based upon the cylinder compression ratio.

* * * * *